(12) United States Patent
Feinberg et al.

(10) Patent No.: US 7,144,938 B1
(45) Date of Patent: Dec. 5, 2006

(54) COMPOSITION COMPRISING IONOMER AND POLYAMIDE

(75) Inventors: Stewart Carl Feinberg, Exton, PA (US); Charles J. Talkowski, Hockessin, DE (US); Keith Christian Andersen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/292,545

(22) Filed: Dec. 2, 2005

(51) Int. Cl.
*C08L 77/00* (2006.01)
*C08K 5/10* (2006.01)

(52) U.S. Cl. .................... 524/318; 524/300; 524/322; 524/514; 525/183

(58) Field of Classification Search ............... 524/300, 524/318, 322, 514; 525/183
See application file for complete search history.

(56) References Cited

U.S. PATENT DOCUMENTS

| | | |
|---|---|---|
| 3,264,269 A | 8/1966 | Rees |
| 3,317,631 A | 5/1967 | Rees |
| 4,248,990 A | 2/1981 | Pieski |
| 5,274,033 A | 12/1993 | Epstein |
| 5,700,890 A | 12/1997 | Chou |
| 5,859,137 A | 1/1999 | Chou |
| 5,866,658 A | 2/1999 | Talkowski |
| 5,902,869 A | 5/1999 | Chou |
| 6,166,171 A * | 12/2000 | Yamamoto et al. ......... 528/310 |
| 6,756,443 B1 | 6/2004 | Feinberg |
| 2002/0004555 A1 | 1/2002 | Di-Benedetto |

* cited by examiner

*Primary Examiner*—Ana Woodward

(57) ABSTRACT

A composition and an article made from the composition are disclosed. The composition comprises, or is produced from, an ionomer, a polyamide, and one or more esters of montanic acid. The article includes film, sheet, filament, tape, molded part, thermoformed product, and container for food or non-food packaging, or combinations of two or more thereof.

16 Claims, No Drawings

COMPOSITION COMPRISING IONOMER AND POLYAMIDE

The invention relates to a composition comprising an ionomer and a polyamide and to a mold release composition derived therefrom.

BACKGROUND OF THE INVENTION

Molded parts such as those in molding beauty panels for golf carts, bumpers, and other molded exterior parts desire high gloss, good weatherability, and high impact strength. Examples of blends of ionomers with polyamides, see e.g., U.S. Pat. Nos. 3,845,163; 5,866,658; and 5,091,478.

Zinc stearate has been used to improve the flow and mold release properties of ionomers such as Surlyn Reflection® available from E. I. du Pont de Nemours and Company, Wilmington, Del., USA (DuPont). While compositions comprising certain polyamide such as Nylon 6 may have sufficient mold release performance, however, those based on other polyamide such as Nylon 12 do not. Increasing the level of zinc stearate to a point where mold release is acceptable can unfortunately produce a composition with poor weld-line strength and impact resistance.

Improved mold release allows shorter cycle times for improved process economics and can allow higher mold temperatures for improved surface gloss and scratch resistance from a harder surface of the molded part.

In commercial operations, mold release agent, generally a polymer or a combination of polymers, can be an emulsion or dispersion in a solvent. If dispersed in a solvent, the solvent is used as a vehicle to wet the surface of a shaped-determining mold, onto which the release agent is applied. There is an increasing need to develop a new composition comprising an ionomer/polyamide blend and having good mold release properties.

SUMMARY OF THE INVENTION

A composition comprises or is produced from an ionomer, a polyamide, and one or more esters of montanic acid.

DETAILED DESCRIPTION OF THE INVENTION

An ionomer can be produced from an ethylene acid copolymer, which is a copolymer comprising repeat units derived from ethylene and at least one comonomer. The repeat units derived from the comonomer can be present in the range of about 5 to about 50%, or about 10 to about 19%, or 12 to 15%, all weight percent (wt %) of the copolymer weight. The comonomer can be an α-, β-ethylenically unsaturated carboxylic acid including one or more (meth) acrylic acids such as methacrylic acid, acrylic acid, itaconic acid, maleic acid, maleic anhydride, fumaric acid, maleic acid monoesters, monoalkyl ester of maleic acid such as monomethyl maleic acid, vinyl acetic acid, fumaric acid monoester, or combinations of two or more thereof. The alkyl group may contain up to about 20 carbon atoms such as methyl, ethyl, butyl, isobutyl, pentyl, hexyl, and combinations of two or more thereof.

An ethylene copolymer may comprise up to 35 wt % of an optional comonomer such as carbon monoxide, sulfur dioxide, acrylonitrile, maleic anhydride, dimethyl maleate, diethyl maleate, dibutyl maleate, dimethyl fumarate, diethyl fumarate, dibutyl fumarate, dimenthyl fumarate, a salt of the α-, β-ethylenically unsaturated carboxylic acids, glycidyl acrylate, glycidyl methacrylate, and glycidyl vinyl ether, vinyl acetate, vinyl propionate, alkyl (meth)acrylate, or combinations of two or more thereof.

Examples of ethylene acid copolymers include, but are not limited to, copolymers of ethylene/acrylic acid, ethylene/methacrylic acid, ethylene/iosbutyl acrylate/methacrylic acid, ethylene/methyl acrylate/maleic acid, or combinations of two or more thereof.

Such ethylene acid copoylmers can be produced by any means known to one skilled in the art using either autoclave or tubular reactors (e.g., U.S. Pat. Nos. 3,264,272, 3,355, 319, 3,404,134, 3,520,861, 4,248,990, 5,028,674, 5,057,593, 5,827,559, 6,500,888 and 6,518,365, disclosures of which are incorporated herein by reference).

The acid moiety of an ethylene copolymer may be neutralized with a cation to produce an ionomer. The neutralization, for example, can range from about 0.1 to about 100, or about 10 to about 90, or about 20 to about 80, or about 20 to about 40 percent, based on the total carboxylic acid content, with a metallic ion. The metallic ions can be monovalent, divalent, trivalent, multivalent, or combinations of two or more thereof. Examples include Li, Na, K, Ag, Hg, Cu, Be, Mg, Ca, Sr, Ba, Cd, Sn, Pb, Fe, Co, Zn, Ni, Al, Sc, Hf, Ti, Zr, Ce, and combinations of two or more thereof. If the metallic ion is multivalent, a complexing agent, such as stearate, oleate, salicylate, and phenolate radicals can be included, as disclosed in U.S. Pat. No. 3,404,134. Frequently used ions include Na, Z, or combinations thereof.

An ionomer of ethylene acid copolymer can be neutralized to a high level to attain a viscosity greater than that of polyamide thereby achieving a desired morphology (ionomer dispersed in continuous or co-continuous nylon phase). For example, a partially neutralized, lower viscosity ethylene/acid copolymer can be blended into polyamide followed by further neutralization to raise the ionomer viscosity while melt blending under intense mixing conditions. The level of neutralization can depend on the ethylene copolymer employed and the properties desired. Neutralization in the blend can raise the melt index (MI) of the ionomer in the blend, measured as grams of ionomer exiting a 0.0823 inch orifice in ten minutes (g/10 min) at 190° C. with 2160 g weight applied force (ASTM D-1238 condition E), to such a level that, if the ionomer alone (not in the polyamide blend) were neutralized to that level, there may be very low to essentially no flow (such as less than about 0.2 g/10 min).

Examples of commercially available ionomer of ethylene acid copolymer include that available from DuPont carrying the trademarks of Surlyn®.

The ionomer can also be a blend of an ionomer having a greater than 20% neutralization and, for example, an ethylene (alkyl)acrylic acid copolymer to achieve the desired degree of neutralization.

The ionomers can be blended or melt-blended with other ionomers or polymers and/or modified by incorporation of organic acids or salts thereof. The organic acids or salts thereof, such as those particularly aliphatic, mono-functional organic acid(s) can have from 6 to 36 carbon atoms per molecule. The organic acids can be one or more at least partially neutralized, aliphatic, mono-functional organic acids having fewer than 36 carbon atoms or salt thereof. Also, greater than 80% or greater than 90% or even 100% of all the acid components in the blend can be neutralized. As disclosed above, the acids in the ionomer are at least partially neutralized a metal ion. The organic acids can be non-volatile and non-migratory. Examples of organic acids are lauric acid, palmitic acid, stearic acid, oleic acid, erucic acid, behenic acid, or combinations of two or more thereof. These acids are also referred to as fatty acids.

The organic acids or salts thereof can be added in an amount sufficient to enhance the antistatic, gas permeation and antifog properties of the copolymer or ionomer over the non-modified copolymer ionomer such as at least about 5 wt %, or at least 15 wt %, or even 30 wt %, up to about 50 wt % of the total amount of copolymer (or ionomer) and organic acid(s).

The composition can comprise polyamide in the range of from about 1 to about 95 wt %, or about 5 to about 80 wt %, or about 10 to about 70 wt %, or 40 to 60 wt %, based on the weight of the composition.

Polyamide can be semicrystalline polyamide, which is well known to one skilled in the art such as those produced from lactams or amino acids or from condensation of diamines such as hexamethylene diamine with dibasic acids such as sebacic acid. Copolymers and terpolymers of these polyamides are also included. Examples include, but are not limited to, polyepsiloncarprolactam (nylon-6), polyhexamethylene adipamide (nylon-66), nylon-11, nylon-12, nylon-12,12, nylon-6/66, nylon-6/610, nylon-6/12, nylon-66/12, nylon-6/66/610, nylon-6/6T, and combinations of two or more thereof.

Amorphous polyamides, those polyamides lacking in crystallinity as shown by the lack of an endotherm crystalline melting peak in a Differential Scanning Calorimeter measurement (ASTM D-3417), can also be used. Examples of amorphous polyamide include hexamethylenediamine isophthalamide, hexamethylenediamine isophthalamide/terephthalamide terpolymer, combinations of 2,2,4- and 2,4,4-trimethylhexamethylenediamine terephthalamide, copolymers of hexamethylene diamine and 2-methylpentamethylenediamine with iso-or terephthalic acids (or combinations of two or more thereof).

Polyamides based on hexamethylenediamine iso/terephthalamide containing terephthalic acid moiety may also be used and can comprise diamine such as 2-methyldiaminopentane. Amorphous polyamides may contain minor amounts of lactam species such as caprolactam or lauryl lactam and, up to about 10 wt % of a liquid or solid plasticizer such as glycerol, sorbitol, mannitol, or aromatic sulfonamide compounds (such as "Santicizer 8" from Monsanto).

The polyamide may have a viscosity higher than that of the ionomer.

Montanic acid, also referred to as gallotanic acid tannin, is a straight-chain mono-carboxylic acid with a chain length in the range of $C_{28}$–$C_{32}$. The materials have high thermal stability and low volatility. An ester of montanic acid is the reaction product of this long chain mono-carboxylic acid with mono- or multi-functional organic alcohols. Such alcohols can include, but are not limited to: methanol, ethanol, and propanol; ethylene glycol, propylene glycol, and butylenes glycol; and glycerol. The carboxylic endgroup may also be completely or partially saponified by reacting with bases such as sodium hydroxide or calcium hydroxide. The stoiciometry of the reaction between montanic acid and the alcohol can be adjusted so that the reaction product, i.e., the mold-release additive produced can be a completely esterified montanic acid, partially esterified montanic acid, completely reacted mono- or multi-functional alcohol, or partially reacted mono- or multi-functional alcohol, completely or partially saponified carboxylic acid salt, or mixtures of any of these. The composition of this mixture will determine, among other things, the viscosity of the product and how miscible or immiscible it will be in the resin to which it is added.

As a result of the long hydrocarbon chain with a polar endgroup, the montanic acid esters have behavior or characteristics as flow modifier, internal lubricant, mold release agent, or combinations of two or more thereof.

An ester of montanic acid can be present in the composition from about 0.001 to about 20, about 0.01 to about 10, or about 0.01 to about 5, wt %.

The composition may also contain components such as ultraviolet (UV) stabilizer, light stabilizer, antioxidant, thermal stabilizer, pigment, dye, filler, anti-slip agents, plasticizers, nucleating agents, flow modifier, or combinations of two or more thereof for both polyamide and ionomer. These components may be present in amounts of about 0.0001 to about 3 or about 0.001 to about 3 wt %.

UV stabilizers include benzophenones such as hydroxy dodecyloxy benzophenone, 2,4-dihydroxybenzophenone, hydroxybenzophenones containing sulfonic groups and the like; triazoles such as 2-phenyl-4-(2',2'- dihydroxylbenzoyl)-triazoles; substituted benzothiazoles such as hydroxyphenylthiazoles and the like; triazines such as 3,5-dialkyl-4- hydroxyphenyl derivatives of triazine, sulfur containing derivatives of dialkyl-4-hydroxy phenyl triazines, hydroxy phenyl-1,3,5-triazine and the like; benzoates such as dibenzoate of diphenylol propane, tertiary butyl benzoate of diphenylol propane and the like; and others such as lower alkyl thiomethylene containing phenols, substituted benzenes such as 1,3- bis-(2'-hydroxybenzoyl)benzene, metal derivatives of 3,5-di-t-butyl-4- hydroxy phenyl proprionic acid, asymmetrical oxalic acid, diarylarides, alkylhydroxyphenyl-thioalkanoic acid ester, and hindered amines of bipiperidyl derivatives. These UV stabilizers are available commercially such as from Ciba Specialty Chemicals, New York (Ciba).

Thermal stabilizers, also be available from Ciba, can include hexamethylene bis(3,5-di-tert-butyl-4-hydroxyhydrocinnamate; 3,5-bis(1,1- dimethylethyl)-4-hydroxybenzenepropanoic acid; 2,2-dimethyl-1-(1- methylethyl)-3-(2-methyl-1-oxopropoxy)propyl phenyl methyl ester; octadecyl 3,5-di-tert-butyl-4-hydroxydrocinnamate; N,N-hexamethylene bis(3,5-di-tert-butyl-4-hydroxyhydrocinnamamide; and tris(2,4-di-tert- butylphenyl)phosphite).

Processing aids include aluminum distearate, zinc stearate, or both.

Pigments include both clear pigments such as inorganic siliceous pigments (silica pigments for example) and conventional pigments used in coating compositions. Examples include metallic oxides such as titanium dioxide, and iron oxide; metal hydroxides; metal flakes such as aluminum flake; chromates such as lead chromate; sulfides; sulfates; carbonates; carbon black; silica; talc; china clay; phthalocyanine blues and greens, organo reds; organo maroons and other organic pigments and dyes. Pigments may be formulated into a millbase by mixing the pigments with a dispersing resin. Pigment dispersions may be formed by conventional means such as sand grinding, ball milling, attritor grinding or two-roll milling.

Nucleating agents can include metal salts, metal oxides, talc, and adipic and benzoic acid and their salts.

Flow modifiers can include polyethylenes waxes and other low molecular weight polyolefins; low molecular weight fluoropolymers, polysiloxanes, and amorphous polyamides; and petroleum and silicone oils and greases, or combinations of two or more thereof.

Other additives such as fiber glass and mineral fillers, anti-slip agents, plasticizers, or combinations of two or more thereof can be incorporated.

The composition can be produced by any method known to one skilled in the art such as dry blending, melt blending, extrusion, or combinations of two or more thereof. For example, various starting ingredients may first be combined with one another in what is commonly referred to as a "salt and pepper" blend. They may also be combined by simultaneous or separate metering or they may be divided and blended in one or more passes into one or more mixing sections of mixing equipment such as extruders, Banbury mixers, Buss Kneaders, Farrell continuous mixers or the like. If more than one extruder feed zone is available, the nylon, the neutralizing agent preferably as a concentrate, and some of the ionomer may be added at the rear most feed port with the remainder of the ionomer being added in a later feed zone. The polymer strands exiting the extruder can be quenched in a water bath prior to cutting into pellets. Alternate methods well recognized by one skilled in the art for pelletizing including underwater cutting and air quenching could be used. Because such methods are well known, the description of which is omitted herein for the interest of brevity.

Molded or shaped articles or parts of the blend of the composition can be mad using standard injection molding techniques exhibit high gloss and improved mar resistance without the need of light graining. A polymer melt obtained after extrusion can be cooled by air or water. A polymer melt can also be cooled on a moving belt under an inert gas such as nitrogen or a series of air ladders or air rings. A polymer melt can be optionally further cooled with dry ice, liquid nitrogen, or other means or aids to allow for sufficient cutting and pelletizing.

The composition can be in the form of powder, granule, pellet, film, multilayer film, or combinations of two or more thereof.

A shaped article can be produced from the composition. The shaped article may be in the form of films, sheets, filaments, tapes, molded parts, thermoformed products, and containers for food or non-food packaging such as those in molding beauty panels for golf carts, bumpers, and other molded exterior parts that desired high gloss, good weatherability, and high impact strength.

Processes for producing these shaped articles are well known to one skilled in the art. For example, films can be produced by methods known to one skilled in the art such as, for example, solution casting, cast film extrusion, blown film extrusion, and thermoplastic film forming (e.g., calendering or stretching). Films can be oriented in one direction by hot-drawing in the machine direction with a tensioning device, and annealing. Films can also be oriented in two directions (machine direction and transverse direction) by suitable tensioning devices. Because such methods are well known to one skilled in the art, the description of which is omitted herein for the interest of brevity.

Films can also be multilayer films produced by laminating one or more films together either by lamination, coextrusion, or using adhesives. For example, a multilayer polymer film can involve two or more layers including an outermost structural layer, an inner barrier layer, and an innermost layer making contact with and compatible with the intended contents of the package and capable of forming seals necessary for enclosing the product to be contained within the package.

EXAMPLES

The following examples are provided to illustrate, but are not to be construed to limit the scope of, the invention.

The raw materials used to prepare the alloys are described below. Chimassorb® 944 FD, hindered amine light stabilizer (Ciba). Irganox® 1010, Tetrakis(methylene(3,5-di-tert-butyl-4- hydroxycinnamate) (Ciba).

Irganox® B1171, 1:2/Irganox® 1010/Irgafos 168 blend; Irgafos 168=Tris(2,4-di-tert-butylphenyl)phosphate (Ciba).

Surlyn® 9120, E/MAA (ethylene/methacrylic acid; 81/19) copolymer, 36% neutralized with zinc, base resin MI=60, ionomer MI=1.0 (DuPont).

Tinuvin® 779 DF, UV stabilizer (Ciba).

Ultramid® B3, Nylon 6 (BASF)

Rilsan AMNO, Nylon 12 (Atofina)

The mold cleaner was Stoner Cleaner/Degreaser A496 and the mold release agent used was Stoner Zero Stick E342 (from Stoner, Inc., Quarryville, Pa.).

Except as otherwise indicated, mixing in each of the examples was in a five heating zone, 28 mm twin-screw extruder equipped with a Kenics Company static mixer between the tip of the extruder and a single hole die plate. The extruder in each case was operated at a screw speed of 200 revolutions per minute (rpm) with the vacuum port run at about 630 mm mercury vacuum with ingredients fed at a rate of about 10 pounds per hour to the respective split feed zones of the extruder. A nitrogen blanket was maintained on the feed hopper. The temperature profile across the length of the extruder was: throat, about 25° C.; Zone 1, 220° C.; Zones 2, 3, 4, and 5, 250° C.; Adapters 1 and 2, 250° C.; and Die, 265° C. Residence time for the samples was about 2.5 minutes. Samples were quenched in a water bath (about 23° C.) prior to cutting into pellets.

Test bars (5 inch by ½ by ⅛), plaques (3 inch by 5 inch by ⅛ inch), and disks (3 inch by ⅛ inch) for physical testing were molded using a single screw injection molding machine. The samples in each case were injection molded on a 6 ounce capacity injection molding machine using a general purpose screw with barrel temperature set to achieve melt temperature in the 260° C. range. Molding conditions employed were fast ram forward speed, 60 rpm screw speed, 50 pounds per square inch gauge (psig) back pressure, 400–800 psig injection pressure, 20 second (sec.) injection time, 30 sec. hold time, and 5/32 inch nozzle.

Various test conditions for determining physical properties were employed.

Melt Index (MI) was determined according to ASTM D1238, condition E, at a temperature of 190° C. and load of 2,160 grams.

Melt Viscosity was determined at 240° C. using a capillary length of 30 mm and capillary diameter of 1 mm.

Tensile properties were determined according to ASTM D1708 using (1½ inch by ⅝ inch by ⅛ inch bars die-cut from plaques (3 inch by 5 inch by ⅛ inch). The measurements were made on an Instron operated at a cross-head speed of 2 inch/minute.

Flexural modulus was measured on (5 inch by ½ inch by ⅛ inch) test bars using a 2 inch span, according to ASTM D790.

Notched Izod impact was determined according to ASTM D256 using (2½ inch by ½ inch by ⅛ inch) bars having a 0.1 inch notch machined into the side of the bar. The bars were derived from either of two sources: (1) A single 5 inch by ½ inch by ⅛ inch molded bar that is then cut into two halves (i.e., one near the gate end and the other is the far end). In this case, the impact values reported represent the average of the two values; or (2) The center 1.5 inch by ½ inch, by ⅛ inch area of an ASTM D638 tensile bar. In this case a single impact values is obtained.

Weld-line strength was determined using the center area of the ASTM D638 tensile bar described just above. In this case, a double gated mold was used so that there was a weld-line approximately in the center of the bar. Izod impact values at this point (unnotched) indicate the strength of the weld-line.

Mold sticking was determined using a Nissei FN4000 200 ton injection molding machine using the 3 inch by 3 inch by 5 inch box mold shown below. The part is pushed off the male part of the mold by four ejector pins. One pin is in each corner of the mold. These are labeled EOC pins—"End of Channel" (EOC). One pin is on each side of the gate at the center of the part. These pins are labeled PST pins—"Post Gate".

One of the EOC pins and one of the PST pins were fitted with pressure tranducers to quantify the force needed to push the part of the mold. The force on the two pins to push a part off was shown in the file. The total of the two was used to characterize "overall release force". The lower the value the better were the mold release properties of the particular formulation.

Machine/process variables that were used to evaluate mold release performance were:

Mold core temperature

Pack pressure (MPa)

The fraction of the total force available to push the box off the inner mold that was used (Eject Forward/EV1).

TABLE 2

| Run No. | 21 | 22 | 23 | 24 | 25 | 26 | 27 |
|---|---|---|---|---|---|---|---|
| Base Resin | RA | RA | RA | RB | RA | RA | RA |
| Lubricant | L1 | L1 | L1 | — | L1 | L2 | L2 |
| Mole Core Temp (° C.) | 25 | 25 | 57 | 57 | 43 | 43 | 43 |
| Pack Pressure (MPa) | 25 | 70 | 70 | 70 | 50 | 25 | 70 |

1. Base resin included Nylon 12 alloy (RA) and Nylon 6 alloy (RB)
2. Lubricant included 1.0% WE-40 + 1.5% H10246 (L1) and 1.0% WE-40 (L2); Run 24 did not have a lubricant

TABLE 3

| MC | U | L | T | U | L | T | U | L | T | U | L | T |
|---|---|---|---|---|---|---|---|---|---|---|---|---|
| 1 | 279 | 159 | 438 | 1027 | 525 | 1552 | 2929 | 2014 | 4943 | 772 | 406 | 1178 |
| 2 | 470 | 318 | 788 | 1059 | 494 | 1553 | * | 907 | 541 | 1448 | 2 | 470 |
| 3 | 525 | 342 | 867 | | | | | | | 653 | 382 | 1035 |
| 4 | 677 | 398 | 1075 | | | | | | | 653 | 358 | 1011 |
| 5 | 756 | 342 | 1098 | | | | | | | 685 | 366 | 1051 |
| 6 | | | | | | | | | | 669 | 390 | 1059 |
| 7 | | | | | | | | | | | ** | |

MC, mold cycle; U, upper; L, lower; and T, total.
*Pins break through on first shot.
**Mold surface polished further - "Shiny Bumps".

Example 1

Example 1 shows an evaluation of a variety of mold release agents presented in Table 1.

TABLE 1

| Run No. | Base Resin[1] | Lubricant[2] | % | Average Release Force (psi) |
|---|---|---|---|---|
| 1 | Nylon 6 Alloy | — | | 740 |
| 2 | Nylon 12 Alloy | ZnSt | 1.5 | 5,800 |
| 3 | Nylon 12 Alloy | ZnSt | 0.75 | 15,750 |
| 4 | Nylon 12 Alloy | EBS | 1 | 4,500 |
| 5 | Nylon 12 Alloy | EBS | 0.66 | 7,000 |
| 6 | Nylon 12 Alloy | EBS | 0.33 | 10,000 |
| 7 | Nylon 12 Alloy | — | | 15,000 |
| 8 | Nylon 12 Alloy | ZnSt | 3 | 6,000 |
| 9 | Nylon 12 Alloy | ZnSt | 3 | 4,200 |
| 10 | Nylon 12 Alloy | WE-40 | 1 | 4,500 |
| 11 | Nylon 12 Alloy | WE-40 | 0.66 | 4,200 |
| 12 | Nylon 12 Alloy | WE-40 | 0.33 | 6,000 |
| 13 | Nylon 12 Alloy | MP 1400 | 1.00 | 14,000 |
| 14 | Nylon 12 Alloy | PETS | 1.00 | 13,000 |

[1]Base resin, generally nylon alloys shown in this table are the same compositions as those shown in Table 6. The alloys were prepared as described in U.S. Pat. Nos. 5,866,658 and 6,399,684.
[2]ZnSt, zinc stearate; WE-40, esterified montanic acid obtained from Clariant Corporation (Charlotte, North Carolina) as Licolub WE-40; MP 1400, Polytetrafluoroethylene powder from DuPont; and PETS, Loxiol PETS, Pentaerythritol tetrastearate from Henkel Chemical Co.

Example 2

This example shows increased mold temperature made the molded part more difficult to remove from the mold (higher mold release force).

In the table, H10246 is a maleic anhydride grafted polyethylene wax. Table 2 shows the composition, Table 3 and 4 show the performance of Runs 21–24 and 25–27, respectively.

TABLE 4

| MC | U | L | T | U | L | T | U | L | T |
|---|---|---|---|---|---|---|---|---|---|
| 1 | 1,003 | 454 | 1,457 | 2,802 | 1,664 | 4,466 | 2,969 | 1,865 | 4,834 |
| 2 | 1,449 | 685 | 2,134 | 2,499 | 1,457 | 3,956 | 3,000 | 1,966 | 4,966 |
| 3 | 1,672 | 884 | 2,556 | 2,404 | 1,425 | 3,829 | 3,025 | 2,006 | 5,031 |
| 4 | 1,855 | 995 | 2,850 | | | | 2,969 | 1,767 | 4,736 |
| 5 | 2,062 | 947 | 3,009 | | | | *** | | |
| 6 | 2,014 | 947 | 2,961 | | | | | | |
| 7 | 1,910 | 891 | 2,801 | | | | | | |
| 8 | 2,070 | 1114 | 3,184 | | | | | | |
| 9 | 2,062 | 947 | 3,009 | | | | | | |

MC, mold cycle; U, upper; L, lower; and T, total.
***Each box needed to be removed by hand from mold.

Example 3

This example shows lower lubricant loadings than the Example 2. Except for runs 32 and 33 shown in Table 5, mold release was sprayed on the box mold core before the boxes were molded and the results are shown in Table 6.

TABLE 5[A]

| Run No. | 31 | 32 | 33 | 34 | 35 | 36 | 37 |
|---|---|---|---|---|---|---|---|
| Lubricant[B] | L3 | L1 | L3 | L1 | L1 | L4 | L2 |
| Mold Core Temp (° C.) | 43 | 43 | 43 | 43 | 57 | 43 | 57 |
| Pack Pressure (MPa) | 50 | 50 | 50 | 50 | 50 | 50 | 50 |

[A]Base resin was Nylon 12 alloy. Run 33 raised Mold Temp. In Run 36, Nylon 12 Alloy with less Nylon 12 than others and run 37 at higher mold Temp.
[B]Lubricant included 1.0% WE-40 + 0.5% H10246 (L3) and 1.0% WE-40 + 1.5% H10246 (L4); Run 24 did not have a lubricant. L1 and L2 are the same as disclosed in Table 2.

TABLE 6[A]

|  | 31 | | | 32 | | | 33 | | | 34 | | |
| --- | --- | --- | --- | --- | --- | --- | --- | --- | --- | --- | --- | --- |
|  | PST | EOC | Total | PST | EOC | Total | PST | EOC | Total | PST | EOC | Total |
| 1 | 685 | 470 | 1155 | C | C | C | C | C | C | 414 | 326 | 740 |
| 2 | 899 | 509 | 1408 | C | C | C | C | C | C | 533 | 366 | 899 |
| 3 | 1282 | 565 | 1847 | C | C | C | C | C | C | 868 | 533 | 1401 |
| 4 | 1242 | 557 | 1799 | 1106 | 557 | 1663 | 1560 | 876 | 2436 | 1313 | 557 | 1870 |
| 5 | 1361 | 637 | 1998 | 1202 | 525 | 1727 | 2125 | 1369 | 3494 | 1616 | 748 | 2364 |
| 6 | 2794 | 1608 | 4402 | 1353 | 613 | 1966 | 2659 | 1640 | 4299 | 1807 | 907 | 2714 |
| 7 |  | N/D |  | 1751 | 844 | 2595 | 3025 | 1974 | 4999 | 2077 | 1385 | 3462 |
| 8 | 2539 | 1441 | 3980 | 2046 | 1035 | 3081 | 3096 | 2070 | 5166 | 2308 | 1329 | 3637 |
| 9 | 2579 | 1465 | 4044 | 2499 | 1345 | 3844 | 3112 | 1918 | 5030 | 2603 | 1536 | 4139 |
| 10 | 2627 | 1520 | 4147 | 2611 | 1425 | 4036 | 3359 | 2396 | 5755 |  |  |  |
| 11 | 2754 | 1831 | 4585 |  | N/D |  |  |  |  |  |  |  |
| 12 |  |  |  | 3072 | 1902 | 4974 |  |  |  |  |  |  |

[A]The numbers in the first row (31, 32, 33, and 34) represent run numbers presented in Table 5 and those in the first column (1 through 12) represent mold cycles.
PST = pressure reading at the Post Gate pin.
EOC = pressure reading at the End of Channel pin, as explained earlier.
The letter "C" stands for collected fourth box molded after mold release spray.
N/D, not determined.

|  | 35 | | | 36 | | | 37 | | |
| --- | --- | --- | --- | --- | --- | --- | --- | --- | --- |
|  | PST | EOC | Total | PST | EOC | Total | PST | EOC | Total |
| 1 | 374 | 358 | 732 | 454 | 350 | 804 | 342 | 310 | 652 |
| 2 | 438 | 358 | 796 | 509 | 414 | 923 | 390 | 318 | 708 |
| 3 | 573 | 509 | 1,082 | 629 | 470 | 1,099 | 629 | 525 | 1,154 |
| 4 | 732 | 414 | 1,146 | 955 | 613 | 1,568 | 1,250 | 748 | 1,998 |
| 5 | 1,075 | 645 | 1,720 | 780 | 462 | 1,242 | 1,529 | 971 | 2,500 |
| 6 | 1,687 | 891 | 2,578 | 1,447 | 685 | 2,132 | 2,141 | 1,560 | 3,701 |
| 7 | 2,261 | 1,488 | 3,749 | 2,133 | 1,218 | 3,351 | 2,714 | 2,276 | 4,990 |
| 8 | 2,563 | 1,847 | 4,410 | 2,229 | 1,385 | 3,614 |  |  |  |
| 9 |  |  |  | 2,810 | 1,894 | 4,704 |  |  |  |

[A]The numbers in the first row (35, 36, and 37) represent run numbers presented in Table 5 and those in the first column (1 through 9) represent mold cycles.

Example 4

Two Nylon 6-based alloys were evaluated, one based on Ultramid B3 (obtained from BASF Corporation) and one based on Nylene 401 (obtained from Custom Resins, Inc.), a lower viscosity Nylon 6 than Ultramid B6. Two formulations containing 1% and 4% of lubricants/mold releases Licolub WE-40 disclosed above Licomate CaV 102 (calcium salt of montanic acid, also from Clariant) were made. The results show 1% Licolub WE-40 was more than sufficient for much improved mold release with the two Nylon 6 alloys. Licomat CaV 102 did not improve mold release even at the 4% level. Licomat CaV102 may be effective at levels higher than 4%.

PHYSICAL PROPERTIES

Runs 41–45 and 51–56 were formulated as shown in Table 7 and Table 8, respectively, which also show the physical properties of the mechanical tests.

TABLE 7

| Run No. | 41 | 42 | 43 | 44 | 45 |
| --- | --- | --- | --- | --- | --- |
| Comments[1] |  |  |  |  |  |
| Surlyn ® 9120 | 41.80% | 41.38% | 40.13% | 41.38% | 40.13% |
| ZnO Conc. (CS8749-5) | 2.25% | 2.23% | 2.16% | 2.23% | 2.16% |
| NaHPO$_3$ | — | — | — | — | — |
| Irganox 1010 antiOxidant | 0.20% | 0.20% | 0.19% | 0.20% | 0.19% |

TABLE 7-continued

| Run No. | 41 | 42 | 43 | 44 | 45 |
| --- | --- | --- | --- | --- | --- |
| Ultramid B3 | 52.30% | 51.78% | 50.21% | 51.78% | 50.21% |
| Nylon 12-Rilsan AMNO from Atofina Chemicals, Inc. | — | — | — | — | — |
| Tinuvin 234 UV Absorber | 0.47% | 0.465% | 0.451% | 0.465% | 0.45% |
| Chimassorb 944 ED Hindered Amine Light Stabilizer | 0.94% | 0.93% | 0.90% | 0.93% | 0.90% |
| Irganox B1171 | 0.37% | 0.366% | 0.355% | 0.366% | 0.355% |
| Zinc stearate | 1.50% | 1.49% | 1.44% | 1.49% | 1.44% |
| Licolub WE-40 | — | 1.00% | 4.00% | — | 0.00% |
| Additive #2 (%) | — | — | — | CaV 102 (1) | CaV 102 (4) |
| NaHPO$_3$ | 0.17% | 0.17% | 0.16% | 0.17% | 0.16% |
| Izod at Weld Line[2] | 29.7 | 30.6 | 27.8 | 30.1 | 18.63 |
| Break Type[2] | Ductile | Ductile | Ductile | Ductile | Ductile |
| Izod at Weld Line[3] | 7.49 | 4.21 | 2.67 | 3.48 | 2.61 |
| Break Type[3] | Brittle | Brittle | Brittle | Brit-duct | Brittle |
| Gate End[4] | 27.5 | 28.4 | 27.9 | 27.5 | 28.16 |
| Break Type[4] | Ductile | Ductile | Ductile | Ductile | Ductile |
| Gate End[5] | 21.2 | 20.2 | 4.19 | 20.0 | 4.89 |
| Break Type[5] | Ductile | Ductile | Brittle | Ductile | Brittle |
| Gate End[7] | 4.25 | 3.79 | 2.71 | 3.63 | 2.66 |
| SD[7] | 0.55 | 0.39 | 0.31 | 0.5 | 0.4 |
| Break Type[7] | Brittle | Brittle | Brittle | Brittle | Brittle |
| 24.3[8] | 645.9 | 688.9 | 669.8 | 641.1 | 660.2 |
| 206.7[8] | 327.6 | 355.7 | 354.0 | 338.8 | 357.4 |
| 401.3[8] | 262.7 | 282.7 | 283.9 | 274.6 | 282.7 |
| 595.9[8] | 232.2 | 247.2 | 249.8 | 241.2 | 245.9 |
| 997.2[8] | 187.9 | 197.6 | 201.3 | 195.8 | 197.0 |

TABLE 7-continued

| Run No. | 41 | 42 | 43 | 44 | 45 |
|---|---|---|---|---|---|
| 997.2[8] | 183.8 | 193.7 | 197.2 | 194.5 | 177.0 |
| 1471.5[8] | 154.2 | 161.0 | 165.4 | 162.7 | 156.0 |

[1]Run 41 was Nylon 6 alloy control; Run 42 was Nylon 6 alloy with 1% Licolub WE-40; Run 43 was Nylon 6 alloy with 4% Licolub WE-40; Run 44 was Nylon 6 Alloy with 1% Licomont CaV 102; and Run 45 was Nylon 6 Alloy with 1% Licomont CaV 102.
[2]Unnotched izod impact at weld line - D638 double-gated tensile bar at room temperature (about 24° C.).
[3]Unnotched izod impact at weld line - D638 double-gated tensile bar at 0° C.
[4]Notched izod impact single-gated bars at room temperature (24° C.).
[5]Notched izod impact single-gated bars at 0° C.
[6]Notched izod impact single-gated bars at 10° C.
[7]Notched izod impact single-gated bars at −30° C.
[8]Capillary rheology at 240° C. (shear viscosity, Pa · Sec).

TABLE 8

| Run No. | 51 | 52 | 53 | 54 | 55 | 56 |
|---|---|---|---|---|---|---|
| Comments[1] | | | | | | |
| Surlyn ® 9120 | 50% | 49.5% | 42% | 41.58% | 48.75% | 40.95% |
| ZnO Conc. (CS8749-5) | 4.9% | 4.85% | 2.92% | 2.89% | 4.68% | 2.85% |
| NaHPO₃ | — | — | 0.18% | 0.18% | 0.20% | 0.18% |
| Irganox 1010 | 0.2% | 0.2% | 2% | 0.2% | 0.19% | 0.2% |
| Ultramid B3 | — | — | — | — | — | — |
| Nylon 12-Rilsan AMNO | 43% | 42.56% | 52% | 52.47% | 42.02% | 51.68% |
| Tinuvin 234 | 0.4% | 0.4% | 0.4% | 0.40% | 0.39% | 0.39% |
| Chimassorb 944 FD | 0.9% | 0.89% | 0.9% | 0.89% | 0.88% | 0.88% |
| Irganox B1171 | 0.4% | 0.4% | 0.40% | 0.40% | 0.39% | 0.39% |
| Zinc stearate | — | 1% | — | — | — | — |
| Licolub WE-40 | — | — | — | 0.4% | 0.39% | 1% |
| Additive #2 | — | — | — | — | H10246 | H10246 |
| (%) | | | | | 1.5 | |
| NaHPO₃ | 0.20% | 0.20% | — | — | — | — |
| Izod at Weld Line[2] | 1.34 | 0.93 | 7.44 | 5.98 | 5.59 | 6.95 |
| Break Type[2] | Brittle | Brittle | Ductile | Ductile | Brittle | Ductile |
| Izod at Weld Line[3] | | | 1.04 | 0.69 | 1.59 | 0.69 |
| Break Type[3] | | | Brittle | Brittle | Brittle | Brittle |
| Gate End[4] | 5.76 | 4.65 | 18.2 | 18.0 | 19.9 | 17.69 |
| Break Type[4] | Brittle | Brittle | Ductile | Ductile | Ductile | Ductile |
| Gate End[5] | 5.58 | 5.18 | 9.66 | 9.07 | 7.69 | 8.15 |
| Break Type[5] | Brittle | Brittle | Britduct | Brittle | Ductile | Brittle |
| Gate End[6] | | | | | | |
| Break Type[6] | | | | | | |
| Gate End[7] | | | 7.63 | 6.82 | 3.54 | 5.8 |
| SD[7] | | | 1.12 | 0.60 | 1.14 | 1.1 |
| Break Type[7] | | | Brittle | Brittle | Brittle | Brittle |
| 24.3[8] | 760.1 | 607.1 | 598.0 | 559.8 | 732.0 | 669.8 |
| 206.7[8] | 458.4 | 369.5 | 363.6 | 353.5 | 430.0 | 342.2 |
| 401.3[8] | 372.9 | 304.5 | 301.3 | 288.3 | 343.0 | 270.8 |
| 595.9[8] | 324.3 | 268.5 | 260.7 | 249.8 | 288.8 | 239.4 |
| 997.2[8] | 266.3 | 223.7 | 215.5 | 203.4 | 235.5 | 190.2 |
| 997.2[8] | 263.6 | 217.0 | 211.1 | 203.5 | 231.0 | 192.3 |
| 1471.5[8] | 219.0 | 183.4 | 175.5 | 169.9 | 197.2 | 162.9 |

[1]Run 51 was Nylon 12 alloy control; Run 52 was Nylon 12 alloy with 1% zinc stearate; Run 53 had higher Nylon 12 than either Run 51 or 55; Run 54 Nylon 12 in Run 53 1% Licolub WE-40; Run 55 was Nylon 12 alloy with 1% WE-40 and 1.5% H10246; and Run 56 was Nylon 12 alloy with 1.5% H10246.
[2-8]See Table 7 footnotes.

Tables 7 and 8 indicate that all invention compositions had better physical properties and mold release than run 52, which contained 1% zinc stearate.

The invention claimed is:

1. A composition comprising, or produced from, an ionomer, a polyamide, and one or more esters of montanic acid wherein the ionomer comprises repeat units derived from ethylene and at least one comonomer and the polyamide includes (a) polyepsiloncaprolactam (nylon-6); (b) polyhexamethylene adipamide (nylon-66); (c) nylon-11; (d) nylon-12; (e) nylon-12,12; (f) nylon-6/66; (g) nylon-6/610; (h) nylon-6/12; (i) nylon-66/12; (j) nylon-6/66/610; (k) nylon-6/6T; (l) polymers of hexamethylenediamine isophthalamide; (m) copolymers of hexamethylenediamine, isophthalamide, and terephthalamide; (n) polymers of 2,2,4-trimethylhexamethylenediamine terephthalamide; (o) polymers of 2,4,4- trimethylhexamethylenediamine terephthalamide; (p) copolymers of hexamethylene diamine and 2-methylpentamethylenediame with iso- or tere-phthalic acids; or (q) combinations of two or more thereof.

2. The compositions of claim 1 wherein the ionomer is an ethylene acid copolymer and the acid moiety of the acid copolymer is neutralized with one or more metal ions.

3. The compositions of claim 2 wherein the ethylene acid copolymer comprises repeat units derived from ethylene and an α-, β-carboxylic acid; and the α-, β-carboxylic acid includes methacrylic acid, acrylic acid, itaconic acid, maleic acid, maleic anhydride, fumaric acid, maleic acid monoesters, monoalkyl ester of maleic acid, vinyl acetic acid, fumaric acid monoester, or combinations of two of more thereof.

4. The composition of claim 3 wherein the ethylene acid copolymer comprises repeat units derived from methyacrylic acid, acrylic acid, or combinations thereof and optionally comprises repeat units derived from another comonomer including carbon monoxide, sulfur dioxide, acrylonitrile, maleic anhydride, dimethyl maleate, diethyl maleate, dibutyl maleate, dimethyl fumarate, diethyl fumarate, dibutyl fumarate, dimethyl fumarate, a salt of the methacrylic acid or acrylic acid, glycidyl acrylate, glycidyl methacrylate, and glycidyl vinyl ether, vinyl acetate, vinyl propionate, alkyl (meth)acrylate, or combinations of two or more thereof.

5. The composition of claim 4 wherein the polyamide includes a nylon-6, nylon-12, or combinations thereof.

6. The composition of claim 5 wherein the ester of montanic acid has a chain length in the range of $C_{28}$–$C_{32}$ and optionally saponified.

7. The composition of claim 2 wherein the ester of montanic acid has a chain length in the range of $C_{28}$–$C_{32}$ and optionally saponified.

8. The composition of claim 7 wherein the ester of montanic acid is saponified.

9. The composition of claim 7 wherein the ionomer comprises an ethylene acid copolymer and the ethylene acid copolymer comprises repeat units derived from methacrylic acid, acrylic acid, or combinations thereof and optionally comprises repeat units derived from another comonomer including carbon monoxide, sulfur dioxide, acrylonitrile; maleic anhydride, dimethyl maleate, diethyl maleate, dibutyl maleate, dimethyl fumarate, diethyl fumarate, dibutyl fumarate, dimethyl fumarate, a salt of the methacrylic acid or acrylic acid, glycidyl acrylate, glycidyl methacrylate, and glycidyl vinyl ether, vinyl acetate, vinyl propionate, alkyl (meth)acrylate, or combinations of two or more thereof.

10. The composition of claim 9 wherein the polyamide includes nylon-6, nylon-12, or combinations thereof.

11. The composition of claim 10 wherein the composition further comprising an additive including UV stabilizer, light stabilizer, antioxidant, thermal stabilizer, pigment, dye, filler, anti-slip agents, plasticizers, nucleating agents, flow modifier, or combinations of two or more thereof.

12. A process comprising combining an ionomer, polyamide, and one or more esters of montanic acid wherein
the ionomer comprises repeat units derived from ethylene and at least one comonomer;
the polyamide includes (a) polyepsiloncaprolactam (nylon-6); (b) polyhexamethylene adipamide (nylon-66); (c) nylon-11; (d) nylon-12; (e) nylon-12,12; (f) nylon-6/66; (g) nylon-6/610; (h) nylon-6/12; (i) nylon-66/12; (j) nylon-6/66/610; (k) nylon-6/6T; (l) polymers of hexamethylenediamine isophthalamide; (m) copolymers of hexamethylenediamine, isophthalamide, and terephthalamide; (n) polymers of 2,2,4- trimethylhexamethylenediamine terephthalamide; (o) polymers of 2,4,4- trimethylhexamethylenediamine terephthalamide; (p) copolymers of hexamethylene diamine and 2-methylpentamethylenediame with iso- or tere-phthalic acids; or (q) combinations of two or more thereof; and
the process includes dry blending, melt blending, extrusion, or combinations of two or more thereof.

13. A shaped or molded article comprising or produced from a composition wherein the shaped article includes film, sheet, filament, tape, molded part, thermoformed product, and container for food or non-food packaging, or combinations of two or more thereof and the composition comprises, or is produced from, ionomer, polyamide, and one or more esters of montanic acid wherein
(1) the polyamide includes (a) polyepsiloncaprolactam (nylon-6); (b) polyhexamethylene adipamide (nylon-66); (c) nylon-11; (d) nylon-12; (e) nylon-12,12; (f) nylon-6/66; (g) nylon-6/610; (h) nylon-6/12; (i) nylon-66/12; (j) nylon-6/66/610; (k) nylon-6/6T; (l) polymers of hexamethylenediamine isophthalamide; (m) copolymers of hexamethylenediamine, isophthalamide, and terephthalamide; (n) polymers of 2,2,4-trimethylhexamethylenediamine terephthalamide; (o) polymers of 2,4,4-trimethylhexamethylenediamine terephthalamide; (p) copolymers of hexamethylene diamine and 2-methylpentamethylenediame with iso- or tere-phthalic acids; or (q) combinations of two or more thereof; and
(2) the ionomer comprises repeat units derived from ethylene and at least one comonomer.

14. The article of claim 13, wherein the ionomer is an ethylene acid copolymer and the acid moiety of the acid copolymer is neutralized with one or more metal ions the ester of montanic acid has a chain length in the range of $C_{28}$–$C_{32}$ and optionally saponified.

15. The article of claim 14 wherein the ethylene acid copolymer comprises repeat units derived from methacrylic acid, acrylic acid, or combinations thereof and optionally comprises repeat units derived from another comonomer including carbon monoxide, sulfur dioxide, acrylonitrile; maleic anhydride, dimethyl maleate, diethyl maleate, dibutyl maleate, dimethyl fumarate, diethyl fumarate, dibutyl fumarate, dimethyl fumarate, a salt of the methacrylic acid or acrylic acid, glycidyl acrylate, glycidyl methacrylate, and glycidyl vinyl ether, vinyl acetate, vinyl propionate, alkyl (meth)acrylate, or combinations of two or more thereof.

16. The article of claim 15 further comprises an additive including UV stabilizer, light stabilizer, antioxidant, thermal stabilizer, pigment, dye, filler, anti-slip agents, plasticizers, nucleating agents, flow modifier, or combinations of two or more thereof.

* * * * *

UNITED STATES PATENT AND TRADEMARK OFFICE
CERTIFICATE OF CORRECTION

PATENT NO.         : 7,144,938 B1
APPLICATION NO. : 11/292545
DATED               : December 5, 2006
INVENTOR(S)       : Stewart Carl Feinberg, Charles J. Talkowski and Keith Christian Andersen It is certified that error appears in the above-identified patent and that said Letters Patent is hereby corrected as shown below:

Claim 2, Column 12, Line 12 - Delete - The compositions of claim 1 wherein the ionomer is an
Add - The composition of claim 1 wherein the ionomer is an Claim 3, Column 12, Line 15 - Delete - The compositions of claim 2 wherein the ethylene acid
Add - The composition of claim 2 wherein the ethylene acid Claim 7, Column 13, Line 14 - Delete - The composition of claim 2 wherein the ester of
Add - The composition of claim 1 wherein the ester of Signed and Sealed this Twenty-sixth Day of June, 2007

JON W. DUDAS
*Director of the United States Patent and Trademark Office*